(12) United States Patent  
Fiset et al.

(10) Patent No.: US 8,258,641 B2  
(45) Date of Patent: Sep. 4, 2012

(54) MECHANICAL REGULATION OF ELECTRICAL FREQUENCY IN AN ELECTRICAL GENERATION SYSTEM

(75) Inventors: Jean Fiset, Lévis (CA); Tony Durand, Saint-Raphael (CA)

(73) Assignee: Concept Fiset Inc., St-Vallier, Quebec (CA)

( * ) Notice: Subject to any disclaimer, the term of this patent is extended or adjusted under 35 U.S.C. 154(b) by 267 days.

(21) Appl. No.: 12/674,458

(22) PCT Filed: Apr. 8, 2008

(86) PCT No.: PCT/CA2008/000667  
§ 371 (c)(1),  
(2), (4) Date: Feb. 22, 2010

(87) PCT Pub. No.: WO2009/026670  
PCT Pub. Date: Mar. 5, 2009

(65) Prior Publication Data  
US 2011/0221191 A1    Sep. 15, 2011

Related U.S. Application Data

(60) Provisional application No. 60/969,306, filed on Aug. 31, 2007.

(51) Int. Cl.  
*F03D 9/00*     (2006.01)
(52) U.S. Cl. ............................................. 290/44; 290/5
(58) Field of Classification Search .............. 290/5, 44, 290/55; 310/112  
See application file for complete search history.

(56) References Cited

U.S. PATENT DOCUMENTS

| | | | |
|---|---|---|---|
| 1,828,943 A | 5/1928 | Rossman | |
| 1,830,485 A | 4/1930 | Rossman | |
| 2,061,983 A | 3/1932 | Rossman | |
| 2,309,904 A | 4/1940 | Hunsdorf | |
| 2,782,329 A | 6/1953 | Kirby et al. | |
| 2,787,747 A | 7/1954 | Drummond | |
| 2,903,641 A | 3/1957 | Roe | |
| 3,885,205 A | 5/1975 | Helmer | |
| 3,974,396 A | 8/1976 | Schonball | |
| 4,087,698 A | 5/1978 | Myers | |
| 4,228,391 A | 10/1980 | Owen | |
| 4,405,028 A | 9/1983 | Price | |
| 4,625,160 A | 11/1986 | Hucker | |
| 4,691,119 A * | 9/1987 | McCabria | 290/4 C |
| 5,274,291 A | 12/1993 | Clarke | |
| 5,709,103 A | 1/1998 | Williams | |
| 6,794,781 B2 | 9/2004 | Razzell et al. | |
| 6,975,045 B2 | 12/2005 | Kurachi et al. | |
| 7,095,128 B2 * | 8/2006 | Canini et al. | 290/44 |
| 7,262,533 B2 | 8/2007 | Fiset | |
| 2011/0272951 A1 * | 11/2011 | Marchand | 290/55 |

FOREIGN PATENT DOCUMENTS

CA       2549194       5/2006

* cited by examiner

*Primary Examiner* — Tho D Ta  
(74) *Attorney, Agent, or Firm* — Fasken Martineau

(57) ABSTRACT

There is provided an electrical generation system for producing an alternating electric current with a regulated frequency from motive power with variable speed. The rotor of an alternator is mechanically coupled to the motive power and thus rotates with a variable speed. In order to compensate for the rotor speed variation, the alternator stator is rotated about the rotor such that the relative speed between the stator and the rotor is regulated. The stator speed is controlled such that the frequency of the produced alternating current is regulated.

36 Claims, 5 Drawing Sheets

MECHANICAL REGULATION OF ELECTRICAL FREQUENCY IN AN ELECTRICAL GENERATION SYSTEM

CROSS-REFERENCE TO RELATED APPLICATIONS

The present application claims priority of U.S. provisional patent application No. 60/969,306 filed on Aug. 31, 2007, the specification of which being hereby incorporated by reference.

TECHNICAL FIELD

The invention relates to the electrical generators and more specifically to the production of an alternating electric current with regulated frequency from a motive power with variable speed.

BACKGROUND

An electrical generator produces alternating current from a motive power typically produced by the rotation of a prime mover such as a gas turbine, a water turbine or a wind turbine for example. When the electrical generator is used as a power production generator to be connected to a large power grid, the frequency of the produced alternating current must match the utility frequency of the power grid. The power production generator will need to be synchronized with the power grid before it is connected.

In typical electrical generators, the rotor is mechanically coupled to the prime mover such that when the speed of the prime mover varies, so does the frequency of the generated electric current. In cases where the speed of the prime mover may vary, such as with typical wind turbines, the speed of the rotor needs to be regulated or the frequency variation of the produced electric current to be corrected.

One solution is to use power electronics to correct the frequency of the produced electric current. A high-power rectifier is used to rectify the produced variable-frequency alternating current to provide direct current. Direct current is then converted back to alternating current with the required frequency using a high-power inverter (AC to DC to AC conversion). Power electronics is energy consuming and decreases the overall efficiency of the electric generator.

The rotation speed of the turbine may also be regulated by adjusting the opening of the supply valve in the case of a water turbine or by adjusting the angle of attack of the blades in the case of a wind turbine. However, the angle of attach often cannot be adjusted with a sufficient time response in cases of a gust of wind.

SUMMARY

There is provided an electrical generation system for producing an alternating electric current with a regulated frequency from motive power with variable speed. The rotor of an alternator is mechanically coupled to the motive power and thus rotates with a variable speed. In order to compensate for the rotor speed variation, the alternator stator is rotated about the rotor such that the relative speed between the stator and the rotor is regulated. The stator speed is controlled such that the frequency of the produced alternating current is regulated.

According to one aspect, there is provided a method for producing an alternating electric current with a regulated frequency from a prime mover having a variable speed. The method comprises: actuating an alternator rotor by transmitting a rotation motion of the prime mover to the rotor, a rotation speed of the rotor varying with the variable speed of the prime mover; producing the alternating current by the rotation of the rotor relative to an alternator stator, a frequency of the alternating current being given by a relative speed between the rotor and the stator; rotating the stator relative the rotor to regulate the relative speed between the rotor and the stator, the rotor and stator rotating about a common axis; and controlling the rotation of the stator to maintain the frequency to the regulated frequency while the rotation speed of the rotor varies.

According to another aspect, there is provided an electrical generation system for producing an alternating electric current with a regulated frequency from a prime mover having a variable speed. The system comprises an alternator having a rotor and a rotative stator, mounted concentrically from one another about a rotation axis, the rotor to be mechanically coupled to the prime mover such that a rotation speed of the rotor varies with the variable speed of the prime mover, an electromagnetic interaction between the rotor and the stator upon a relative rotation motion of the rotor to the stator producing the alternating current in the stator, the frequency of the alternating current being given by a relative speed between the rotor and the stator. The system further comprises an auxiliary machine drivingly connected to the stator to drive a rotation of the stator, and a controlling unit connected to the auxiliary machine for controlling the rotation of the auxiliary machine and thereby of the stator to regulate the relative speed between the rotor and the stator while the rotation speed of the rotor varies, thereby regulating the frequency.

According to another aspect, there is provided an electrical generation system for producing an alternating electric current synchronised with a power grid to which it is to be connected, from a prime mover having a variable speed. The system comprises an alternator having a rotor and a rotative stator mounted concentrically from one another about a rotation axis, the rotor to be mechanically coupled to the prime mover such that a rotation speed of the rotor varies with the variable speed of the prime mover, an electromagnetic interaction between the rotor and the stator upon a relative rotation motion of the rotor to the stator producing the alternating current in the stator, an alternator synchronous speed being defined by a relative speed between the rotor and the stator. The system further comprises an auxiliary machine drivingly connected to the stator to drive a rotation of the stator, and a controlling unit connected to the auxiliary machine for controlling the rotation of the auxiliary machine and thereby of the stator to regulate the alternator synchronous speed to the power grid synchronous speed required by the power grid while the rotation speed of the rotor varies.

According to another aspect, there is provide a method for producing an alternating electric current synchronised with a power grid to which it is to be connected, from a prime mover having a variable speed. The method comprises: actuating an alternator rotor by transmitting a rotation motion of the prime mover to the rotor, a rotation speed of the rotor varying with the variable speed of the prime mover; producing the alternating current by the rotation of the rotor relative to an alternator stator, an alternator synchronous speed being defined by a relative speed between the rotor and the stator; rotating the stator relative the rotor to regulate the relative speed between the rotor and the stator, the rotor and stator rotating about a common axis; and controlling the rotation of the stator to maintain the alternator synchronous speed to a power grid synchronous speed required by the power grid while the rotation speed of the rotor varies.

BRIEF DESCRIPTION OF THE DRAWINGS

It will be noted that throughout the appended drawings, like features are identified by like reference numerals.

DETAILED DESCRIPTION

Figure 1:
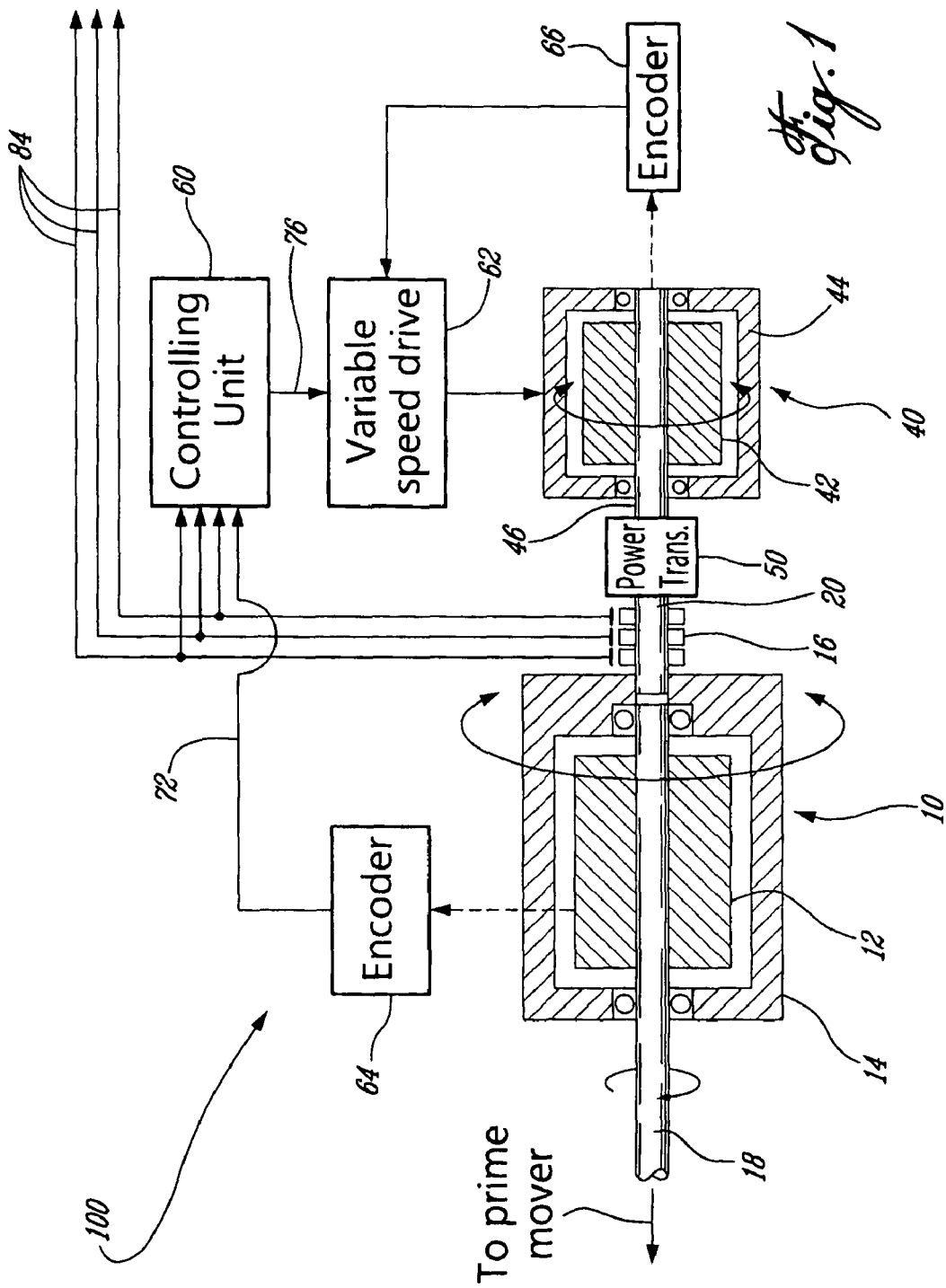
FIG. 1 is a schematic view illustrating an electrical generation system for producing electric current with a regulated frequency.

FIG. 1 illustrates an electrical generation system 100 for producing alternating electric current 84 with a regulated frequency from motive power with variable rotation speed. A synchronous alternator 10 having a rotor 12 and a rotative stator 14 mounted concentrically from one another is mechanically coupled to a prime mover through the rotor shaft 18 such that rotation of the prime mover drives the rotation of the rotor 12. As the rotation speed of the prime mover varies, so does the rotation speed of the rotor 12. The alternator 10 is typically a three-phase brushless alternator with a permanent magnet rotor 12 and a four-pole electrical winding stator 14. The principles presented herein can also be applied to other alternators such as single-phase or four-phase alternators for example. It is noted that the term stator is used herein by analogy to conventional alternators in which the stator is fixed, i.e. static. In the embodiments presented herein the stator 14 has an electric function which is in all aspects similar to conventional stators, but for the fact that it is allowed to rotate. The stator 14 is mechanically coupled to a rotative stator shaft 20 that rotates with the stator 14. Slip ring connectors 16 located on the stator shaft 20 allows the electric current produced in the electrical windings of the stator 14 to be collected while the stator 14 rotates. As will be explained below, the stator 14 is allowed to rotate in both directions about its rotation axis.

Rotation of the prime mover drives the rotation of the rotor 12 and the electromagnetic interaction between the rotor 12 and the stator 14 generates an alternating electric current 84 in the electrical windings of the stator 14. The frequency of the alternating current is related to the relative rotation speed between the rotor 12 and the stator 14.

By controlling the rotation of the stator 14 about the rotor 12, the relative speed, and thereby the frequency of the generated electric current, can be regulated. For example, in a typical wind turbine generator, a 60-Hz alternating current is generated in a four-pole three-phase alternator that rotates at 1800 rotations per minute (rpm). When the wind is strong, the speed of the prime mover, i.e. the wind turbine, may rotate faster, at 2000 rpm for example. In order to compensate for such a higher rotation speed of the rotor 12, the stator 14 is rotated at 200 rpm in the direction of rotation of the rotor. The relative speed between the rotor 12 and the stator 14 is thus 1800 rpm [2000 rpm−200 rpm=1800 rpm]. If the speed of the rotor 12 decreases due to weak winds for example, e.g. at 1500 rpm, the stator 14 is rotated at 300 rpm in the direction opposite to the rotor 12. The relative speed is thus 1800 rpm (1500 rpm+300 rpm=1800 rpm).

Rotation of the stator is driven by an auxiliary electric machine 40 which is a synchronous machine with a rotor 42 and a stator 44. The stator 44 of the electric machine 40 is however static, i.e. it is not allowed to rotate. The central shaft 46 of the rotor 42 is drivingly connected to the rotative stator 14 through its shaft 20 to mechanically drive its rotation. In the examples illustrated herein, the rotor shaft 46 and the stator shaft 20 are connected using a belt and pulleys arrangement (see FIGS. 2 and 3) but it is noted that a roller chain and sprocket arrangement, a gear arrangement or any other power transmission arrangement 50 may also be used. The electric machine 40 comprises a variable speed drive 62 that is used to energize the stator windings in such a manner that the rotation speed of the electric machine 40 can be controllably varied. The variable speed drive 62 receives a control signal 76 from a controlling unit 60 and energizes the electric machine 40 accordingly. The variable speed drive 62 also receives feedback from an encoder 66 which senses the rotor position, or the rotor speed, in the electric machine 40. The controlling unit 60 is used in a closed loop configuration to control the rotation of the electric machine 40 and consequently of the rotative stator 14 to regulate the relative speed between the rotor 12 and the stator 14, thereby regulating the frequency of the produced alternating current 84.

In the illustrated system 100, the controlling unit 60 receives a feedback signal 72 from an encoder 64 which senses the position, or the speed, of the rotor 12 in order to control the rotation speed of the stator 14. In this case, the encoder 64 is positioned on the rotor 12 to sense the position, and thereby the speed, of the rotor 12. The controlling unit also reads the produced alternating current 84 as a feedback. From the received feedback signal 72 and/or alternating current 84, the controlling unit 60 produces the control signal 76 which is inputted to the variable speed drive 62 to control the rotation of the electric machine 40 and thereby of the stator 14. As will be described below, the controlling unit 60 may use feedback from the feedback signal 72, the reading of the alternating current 84, or a combination of both. The controlling unit 60 can be provided as a programmable logic controller, a computer or any other processing unit for example. As described herein below, the control of the electric machine 40 can be performed in speed or in torque.

The variable speed drive 62 is typically powered using the electric current 84 produced by the alternator 10 and the frequency regulation consequently consumes part of the produced power but the total balance of produced electric power remains positive.

It is noted that the encoder 64 may sense, the relative position, or speed, between the rotor 12 and the stator 14 as well. Accordingly, in another embodiment, the encoder 64 senses the relative position between the rotor 12 and the stator 14 to produce the feedback signal 72.

Figure 2:
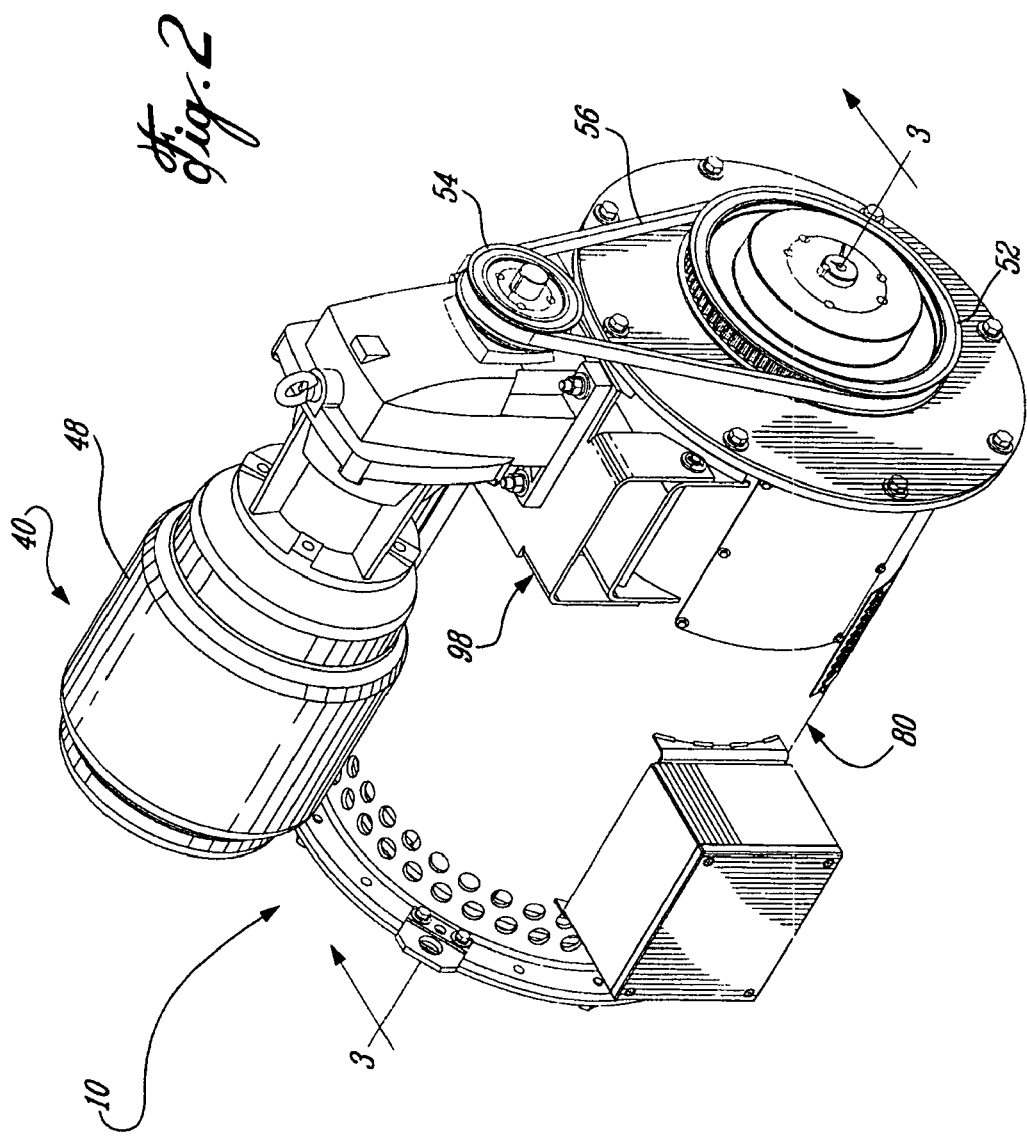
FIG. 2 is a perspective view of the mechanical components of an example embodiment of the electrical generation system of FIG. 1.
Figure 3:
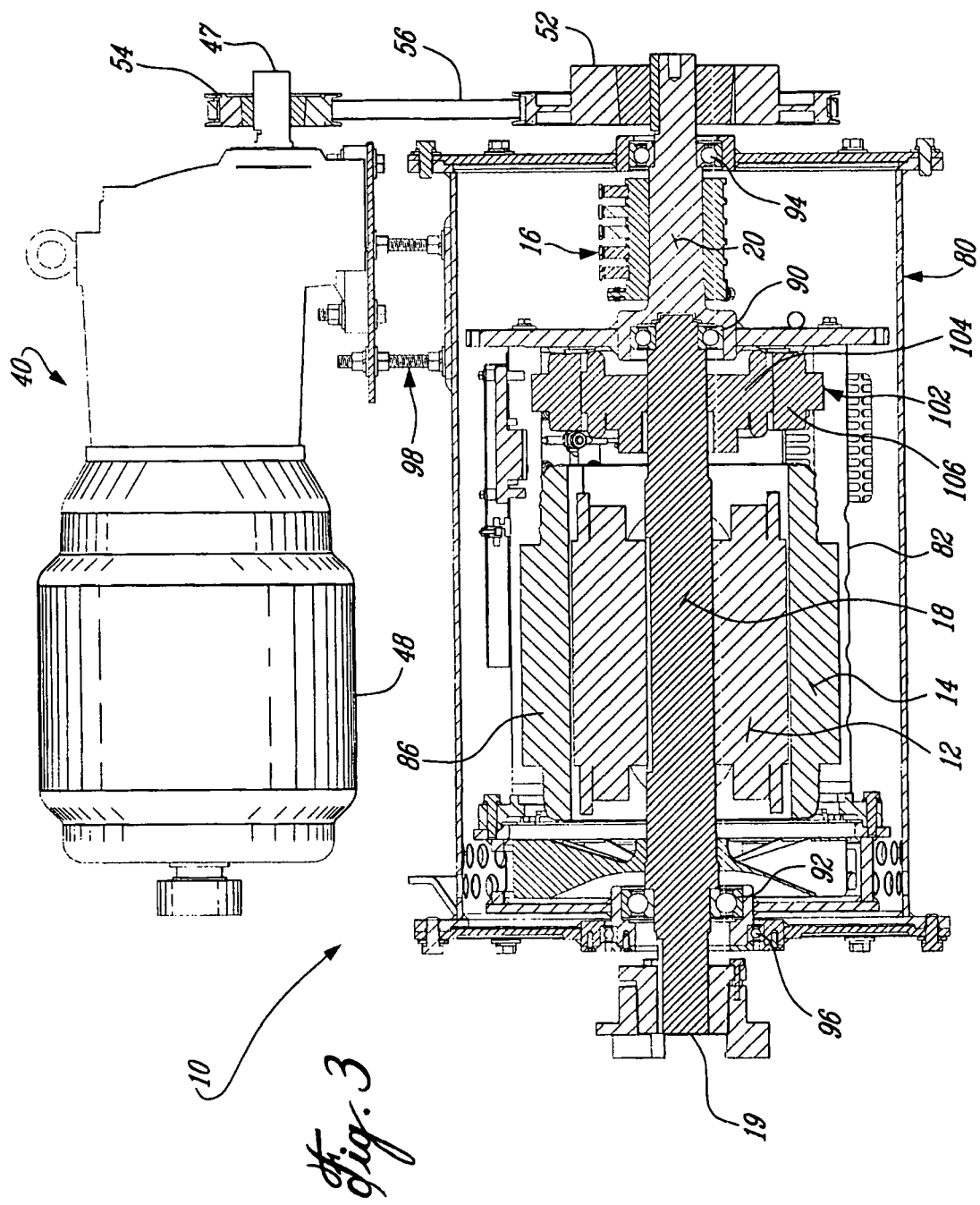
FIG. 3 is a partial cross-sectional view taken along line 3-3 of the mechanical components of FIG. 2.
Figure 4:
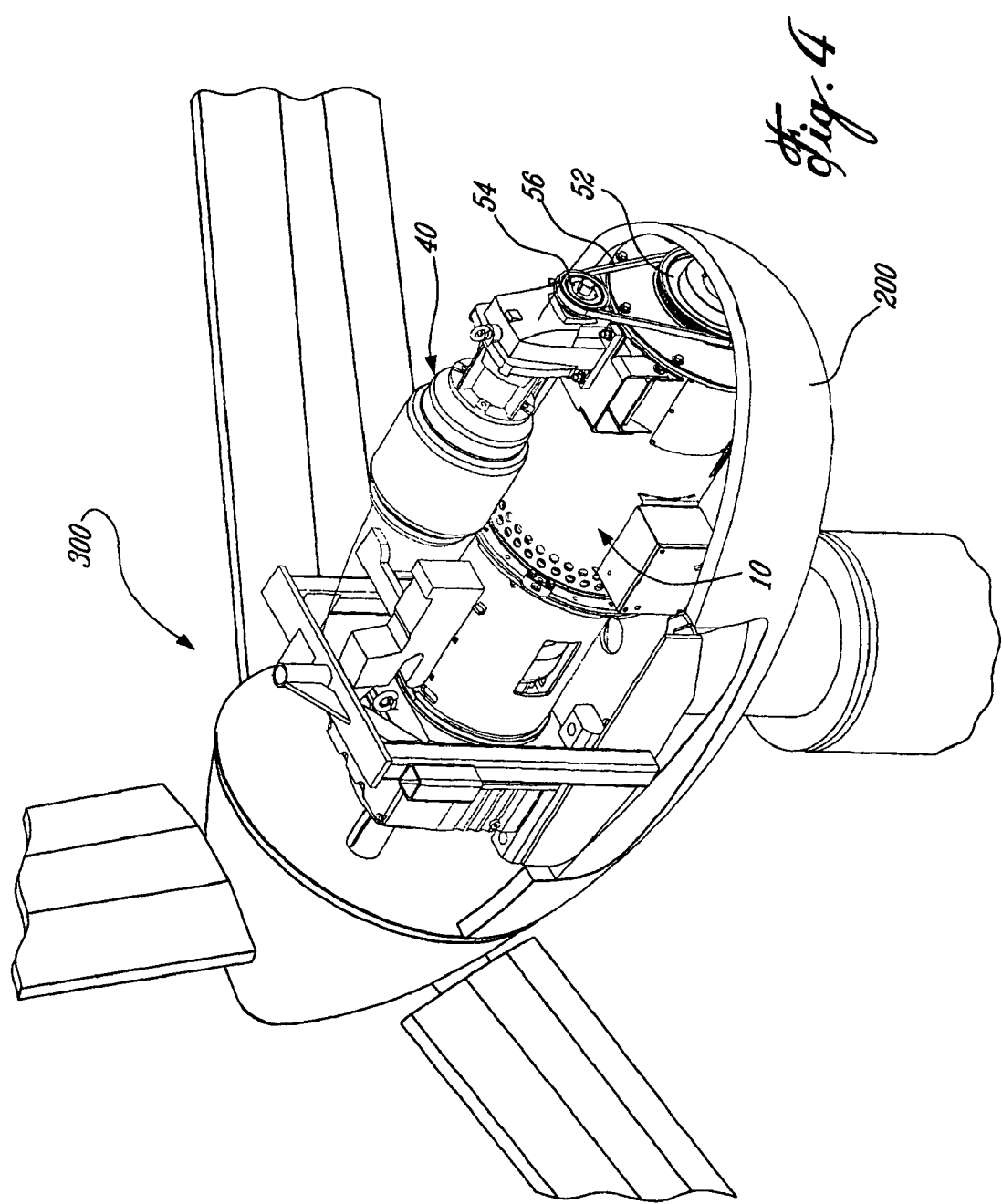
FIG. 4 is a perspective view, partly sectioned, of the mechanical components of FIG. 2 mounted in a nacelle of a wind turbine.

FIGS. 2 and 3 show the mechanical components of the electrical generation system 100 of FIG. 1. FIG. 4 shows the mechanical components mounted in a nacelle 200 of a wind turbine 300. The rotor 12 and stator 14 are mounted in a cylindrical casing 80. Both rotor 12 and stator 14 are mounted to be rotatable about a common rotation axle. The rotor shaft 18 and the stator shaft 20 are mounted inline one at the end of the other, a proximate end of the stator shaft 20 embracing a proximate end of the rotor shaft 18 with a rotary bearing joint 90 in-between, thereby allowing both shafts 18 and 20 to rotate from one another and about the common rotation axle. The distal end of the stator shaft 20 is mounted about a first end of the casing 80 using rotary bearings 94 and the distal end of the rotor shaft 18 is mounted about a second end of the casing 80 using rotary bearings 92. Each of the rotor and stator shafts 18 and 20 is then allowed to rotate independently about the casing 80. The rotor 12 is mounted concentrically over the rotor shaft 18. The stator 14 is mounted concentrically outside of the rotor 12, the stator 14 comprising stator windings 86 supported by a cylindrical stator frame 82. A first end of the stator frame 82 is fixed over the stator shaft 20 at junction of the rotor and stator shafts 18 and 20, and is rotatively mounted about the second end of the casing 80 using rotary bearings 96 on its second end. The stator frame 82 rotates with the stator shaft 20 and the stator windings 86 are fixed to the interior of the stator frame 82 such that they are located in close relationship with the rotor 12 for electromagnetic interaction. The stator windings 86 are electrically connected to the slip rings 16 affixed to the stator shaft 20 between bearings 90 and 94. Brushes (not shown) are used to collect the electric current produced in the stator windings and available on the slip rings 16.

Inside the stator frame 82, an exciter generator 102 is also mounted besides the rotor 12 on the rotor shaft 18. A rotor portion 104 of the exciter generator 102 is affixed to the rotor shaft 18, and a stator portion 106 of the exciter generator 102 is affixed to the stator frame.

The distal end 19 of the rotor shaft 18 extending outside the casing 80 is mechanically coupled to the prime mover (not shown).

The electric machine 40 is mounted in a casing 48 affixed on top of the casing 80 using assembling means 98 comprising brackets and bolts such that the output shaft 47 of the electric machine 40 is aligned in parallel relationship with the stator shaft 20. The output shaft 47 of the electric machine 40 and the stator shaft 20 are drivingly connected using a timing belt 56 and pulleys 52 and 54. The pulley 52 is fitted to the distal end of the stator shaft 20 extending outside the casing 80 and the pulley 54 is fitted to the output shaft 47 of the electric machine 40 such that both pulleys 52, 54 are vertically aligned from one another. The timing belt 56 links the two pulleys 52, 54 for one to drive the other.

The following describes the operation of the electrical generation system 100 when connected to a large power grid. When a synchronous alternator is connected to a large power grid, the power grid should be considered as infinitively large since such a power grid is made up of hundreds of alternators and submitted to thousands of charges. The power grid thus fixes a voltage, a frequency and a phase. Accordingly, as the alternator 10 is connected to the power grid, the voltage $E_0$ at the stator is given by the voltage of the power grid $E_b$, i.e. both voltages are equal in magnitude value and in phase. The alternator 10 still requires to be synchronized with the power grid so that it produces useful electric power.

The electric power produced by a synchronous alternator is given by:

$$P = \frac{E_0 E_b}{X_s} \sin\delta, \qquad (1)$$

where $X_s$ is the synchronous reactance per phase of the alternator 10 and $\delta$ is the electric phase between the rotor electric field and the stator electric field. The rotor electric field is given by the position of the rotor in the alternator and the stator field is given by the phase of the voltage $E_b$ in the case of a static stator and by a combination of the phase of the voltage $E_b$ and the stator position in the case of a rotative stator. According to equation (1), the maximum power produced by the alternator should be 90° but for stability reasons, the nominal electric phase is fixed to 30°.

In a 60-Hz four-pole alternator the rotation speed of the stator electric field, which is also called the synchronous speed, is 1800 rpm. In a synchronous alternator, the rotation speed of the stator field should be equal to the rotation speed of the rotor field so that the stator and rotor field are stationary relative to one another and so that the nominal electric phase is maintained. In a mechanical point of view, the synchronous speed is given by:

$$n_{sync} = n_{rotor} - n_{stator}, \qquad (2)$$

where $n_{sync}$ is the synchronous speed, $n_{rotor}$ is the rotor rotation speed and $n_{stator}$ is the stator rotation speed. Since the stator field is governed by the power grid to which it is connected, in order for the stator and rotor field to be stationary relative to one another, we should have:

$$n_{stator} = n_{rotor} - n_{sync}, \qquad (3)$$

where a negative value of $n_{stator}$ is for a stator that rotates in a direction opposite to the direction of the rotor.

Accordingly, in a conventional alternator, the stator is fixed while the rotor rotates. Consequently, in a 60-Hz four-pole alternator, the rotor speed should be held constantly to 1800 rpm. As explained above, in the configuration presented herein, in order to maintain a synchronous speed at 1800 rpm when the rotor speed is 1650 rpm, the stator is rotated at 150 rpm in the opposite direction so as to maintain a relative speed of 1800 rpm. When the rotor speed is 1800 rpm, the stator is held mechanically stationary. When the rotor speed is 1950 rpm, the stator is rotated at 150 rpm in the same direction.

Feedback control loop illustrated in FIG. 1 is based both on the monitoring of the rotation speed of the rotor 12 in the alternator 10 using the encoder 64 and the monitoring of the produced alternating current 84. Before connecting the alternator 10 to the power grid, the system 100 should be synchronized. A synchroscope (not shown) will allow the power grid connection only when the alternator 10 is synchronized with the power grid. In order to synchronise the electric generation system 100 to the power grid when planning a connection, the control unit 60 receives a feedback signal 72 which represents the rotation speed of the rotor 14 and provides a control signal 76 in speed to the variable speed drive 62. In this stage, feedback from the produced alternating current 84 is not used and the control of the auxiliary electric machine 40 is performed in speed. The synchroscope connects the alternator 10 to the power grid when synchronisation conditions are met.

Thereafter, the tension and frequency of the electric power produced by alternator 10 are fixed by the power grid. The control of the auxiliary electric machine 40 then switches in torque instead of speed, i.e. the control signal 76 is applied in torque instead of speed. According to Newton's reaction law, the torque generated by the rotor 12 (action) is equal in magnitude but opposite in direction to the torque applied to the stator 14. Electric power produced by the alternator 10 is directly related to the rotor torque and thereby to the stator torque. The rotor torque generated by a wind turbine for example is quite variable since it is subject to the wind fluctuations. The control signal 76 acting on the torque applied to the stator minimizes the impact of rotor torque fluctuations on the alternator 10. The controlling unit 60 therefore optimises the torque generated by the rotor 12 by adjusting the torque applied by the auxiliary electric machine 40 to the stator 14. In this stage, the control unit 60 primarily uses feedback from the produced alternating current, but feedback from the feedback signal 72 may still be used for diagnosis or other monitoring functions. The control unit 60 uses an algorithm that adjusts the torque applied to the auxiliary electric machine 40 so as to that maximises the power of the produced alternating current 84, i.e. the control unit 60 uses a maximum power searching algorithm based on feedback from the produced alternating current 84.

It is noted that the resultant of the latter control scheme is that the relative rotation between the rotor 12 and the stator 14 will be regulated to the synchronous speed fixed by the power grid and that the frequency of the produced electric current will be maintained to a desired nominal frequency of the power grid while the rotation speed of the rotor varies.

It is noted that in another embodiment, the auxiliary electric machine 40 remains controlled in speed after connection to the power grid. In still another embodiment, the control unit 60 uses feedback from the encoder 64 only, even after connection to the power grid. Other control schemes are also possible.

It is also noted that while a synchronous alternator 10 is used in the generation system 100, an asynchronous alternator may also be used. The synchroscope may then be omitted.

Figure 5:
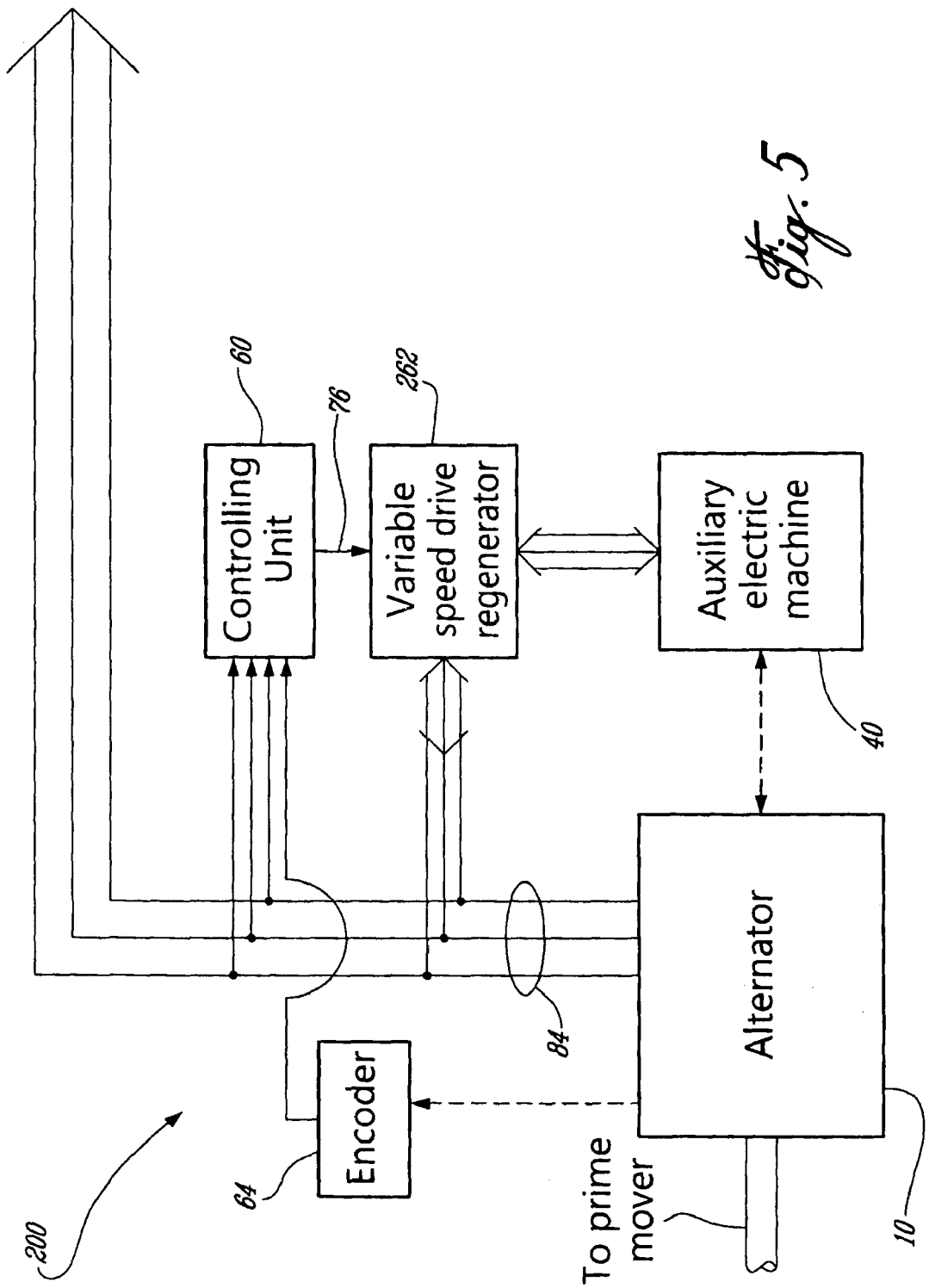
FIG. 5 is a block diagram illustrating an example electrical generation system configured for reclaiming electric power generated by the auxiliary electric machine.

FIG. 5 illustrates another example of an electrical generation system 200 in a configuration allowing reclaiming of an electrical power generated in the auxiliary electric machine 40 when the rotor speed is above the synchronous speed. Most components are equivalent to the corresponding components of the system 100 of FIG. 1 and the description of like elements will therefore not be repeated. The variable speed drive 62 of the system 10 is replaced by a variable speed drive/regenerator 262 in the system 200. When the rotor speed is below the synchronous speed, the variable speed drive/regenerator 262 works as a variable speed drive and when the rotor speed is above the synchronous speed, the variable speed drive/regenerator 262 works as a regenerator. The variable speed drive/regenerator 262 then receives the electric current produced by the auxiliary electric machine 40 and converts its frequency in order to reclaim the produced auxiliary electric current to the power grid.

As described above, when the rotor speed is above the synchronous speed, the stator 14 is rotated in the direction of the rotor 12 to regulate the relative speed between the rotor 12 and the stator 14 to the synchronous speed. In fact, the electromagnetic interaction between the rotor 12 and the stator 14 drags the stator 14 to effectively rotate in the direction of the rotor 12. Accordingly, the electric machine 40 which is then driven by the rotation of the stator 14 acts as an alternator and produces electric current. The produced auxiliary electric current can be output as an auxiliary source of electric power. It is however noted that the produced auxiliary electric current is not necessarily synchronised with the frequency of the power grid. Before being connected to the power grid, the variable speed drive/regenerator 262 rectifies and inverts the auxiliary electric current to the nominal frequency of the power grid.

It is noted that, in another embodiment, a separate inverter is used instead of a variable speed drive/regenerator for reclaiming the electrical power generated in the auxiliary electric machine 40.

It should be noted that the principles presented herein are especially useful in the case of wind turbine generators but may also find applications in other types of generators such as water turbine generators for example.

The above description is meant to be exemplary only, and one skilled in the art will recognize that changes may be made to the embodiments described without departing from the scope of the invention disclosed. For example, the described generator can be adapted of any type of electrical generator including water turbine and gas turbine generators. The stator windings and rotor permanent magnets can also be interchanged to provide an electrical winding rotor 12 and a permanent magnet rotative stator 14 be a permanent magnet stator. Slit rings should then be used on the rotor 12 instead of the stator 14. The auxiliary electric machine may also be replaced by any motor such as a hydraulic motor for example. The embodiments described above are intended to be exemplary only. The scope of the invention is therefore intended to be limited solely by the appended claims.

The invention claimed is:

1. A method for producing an alternating electric current with a regulated frequency from a prime mover having a variable speed, the method comprising:
   actuating an alternator rotor by transmitting a rotation motion of the prime mover to the rotor, a rotation speed of the rotor varying with the variable speed of the prime mover;
   producing the alternating current by the rotation of the rotor relative to an alternator stator, a frequency of the alternating current being given by a relative speed between the rotor and the stator;
   rotating the stator relative the rotor by driving the stator with an auxiliary machine to regulate the relative speed between the rotor and the stator, the rotation speed of the stator being given by the speed of the auxiliary machine, the rotor and stator rotating about a common axis, including rotating the stator in a direction of rotation of the rotor when the rotation speed of the rotor is above a given speed and in a direction opposite to the direction of rotation of the rotor when the speed of the rotor is below the given speed; and
   controlling the rotation of the stator to maintain said frequency to said regulated frequency while the rotation speed of the rotor varies.

2. The method as claimed in claim 1, wherein said controlling the rotation speed of the stator comprises generating a torque control signal to control the torque to be produced by the auxiliary machine using feedback on the measured parameter.

3. The method as claimed in claim 1, further comprising, when the rotation speed of the rotor is above a given speed, converting an auxiliary electric power produced by the electric machine to a converted electric power having the desired frequency value and reclaiming the converted electric power.

4. The method as claimed in claim 1, wherein said prime mover comprises a wind turbine and wherein said actuating comprises connecting the alternator rotor to the wind turbine.

5. The method as claimed in claim 1, wherein said controlling comprises:
   measuring a parameter indicative of at least one of said relative speed and the rotation speed of the rotor; and
   controlling a rotation speed of the stator using feedback on the measured parameter.

6. The method as claimed in claim 5, wherein said parameter comprises a position of the rotor.

7. The method as claimed in claim 5, wherein said parameter comprises the produced alternating current.

8. An electrical generation system for producing an alternating electric current with a regulated frequency from a prime mover having a variable speed, the system comprising:
   an alternator having a rotor and a rotative stator, mounted concentrically from one another about a rotation axis, said rotor to be mechanically coupled to the prime mover such that a rotation speed of the rotor varies with the variable speed of the prime mover, an electromagnetic interaction between the rotor and the stator upon a relative rotation motion of the rotor to the stator producing the alternating current in the stator, the frequency of the alternating current being given by a relative speed between the rotor and the stator, wherein said stator is mounted for bidirectional rotation about the rotation axis such that the stator is to rotate in a direction of rotation of the rotor when the rotation speed of the rotor is above a given speed and in a direction opposite to the direction of rotation of the rotor when the speed of the rotor is below the given value;

an auxiliary machine drivingly connected to the stator to drive a rotation of the stator, the rotation speed of the stator being given by the speed of the auxiliary machine; and a controlling unit connected to the auxiliary machine for controlling the rotation of the auxiliary machine and thereby of the stator to regulate the relative speed between the rotor and the stator while the rotation speed of the rotor varies, thereby regulating said frequency.

9. The system as claimed in claim 8, wherein said rotor comprises a permanent magnet rotor.

10. The system as claimed in claim 8, wherein said rotative stator comprises stator windings connected to slit ring connectors to collect the electrical current in the stator windings while the stator rotates.

11. The system as claimed in claim 8, wherein said auxiliary machine comprises a synchronous electric machine.

12. The system as claimed in claim 8, wherein said prime mover comprises a wind turbine, said rotor being mechanically coupled to said wind turbine.

13. The system as claimed in claim 8, wherein said alternator comprises a synchronous alternator.

14. The system as claimed in claim 8, wherein said controlling unit receives a feedback signal indicative of at least one of said relative speed and the rotation speed of the rotor, and wherein said controlling unit is to produce a control signal according to said feedback signal for said controlling the rotation of the auxiliary machine.

15. The system as claimed in claim 14, wherein said control signal comprises a torque control signal to control the torque to be produced by the auxiliary machine.

16. The system as claimed in claim 14, further comprising a speed detector located on the alternator for providing said feedback signal.

17. The system as claimed in claim 14, wherein said feedback signal comprises the produced alternating current, and wherein said controlling unit is to produce said control signal further according to the produced alternating current for said controlling the rotation of the auxiliary machine.

18. The system as claimed in claim 14, wherein said auxiliary machine comprises an electric machine and a variable speed drive receiving said control signal for driving the electric machine.

19. The system as claimed in claim 18, wherein said variable speed drive comprises a regenerator to, when the rotation speed of the rotor is above a given speed, convert an auxiliary electric power produced by the electric machine to a converted electric power having the desired frequency value to reclaim the auxiliary electric power.

20. An electrical generation system for producing an alternating electric current synchronised with a power grid to which it is to be connected, from a prime mover having a variable speed, the system comprising:

an alternator having a rotor and a rotative stator mounted concentrically from one another about a rotation axis, said rotor to be mechanically coupled to the prime mover such that a rotation speed of the rotor varies with the variable speed of the prime mover, an electromagnetic interaction between the rotor and the stator upon a relative rotation motion of the rotor to the stator producing the alternating current in the stator, an alternator synchronous speed being defined by a relative speed between the rotor and the stator, wherein said stator is mounted for bidirectional rotation about the rotation axis such that the stator is to rotate in a direction of rotation of the rotor when the alternator synchronous speed is above a given speed and in a direction opposite to the direction of rotation of the rotor when the alternator synchronous speed is below the given speed;

an auxiliary machine drivingly connected to the stator to drive a rotation of the stator, the rotation speed of the stator being given by the speed of the auxiliary machine;

a controlling unit connected to the auxiliary machine for controlling the rotation of the auxiliary machine and thereby of the stator to regulate the alternator synchronous speed to the power grid synchronous speed required by the power grid while the rotation speed of the rotor varies.

21. The system as claimed in claim 20, wherein said control signal comprises a torque control signal to control the torque to be produced by the auxiliary machine.

22. The system as claimed in claim 20, further comprising a speed detector located on the alternator for providing said feedback signal.

23. The system as claimed in claim 20, wherein said rotor comprises a permanent magnet rotor.

24. The system as claimed in claim 20, wherein said rotative stator comprises stator windings connected to slit ring connectors to collect the electrical current in the stator windings while the stator rotates.

25. The system as claimed in claim 20, wherein said auxiliary machine comprises a synchronous electric machine.

26. The system as claimed in claim 20, wherein said prime mover comprises a wind turbine, said rotor being mechanically coupled to said wind turbine.

27. The system as claimed in claim 20, wherein said alternator comprises a synchronous alternator.

28. The system as claimed in claim 20, wherein said controlling unit receives a feedback signal indicative of at least one of said relative speed and the rotation speed of the rotor, and wherein said controlling unit is to produce a control signal according to said feedback signal for said controlling the rotation of the auxiliary machine.

29. The system as claimed in claim 28, wherein said feedback signal comprises the produced alternating current, and wherein said controlling unit is to produce said control signal further according to the produced alternating current for said controlling the rotation of the auxiliary machine.

30. The system as claimed in claim 28, wherein said auxiliary machine comprises an electric machine and a variable speed drive receiving said control signal for driving the auxiliary machine.

31. The system as claimed in claim 30, wherein said variable speed drive comprises a regenerator to, when the rotation speed of the rotor is above a given speed, convert an auxiliary electric power produced by the electric machine to a converted electric power synchronized with the power grid synchronous speed to reclaim the auxiliary electric power.

32. A method for producing an alternating electric current synchronised with a power grid to which it is to be connected, from a prime mover having a variable speed, the method comprising:

actuating an alternator rotor by transmitting a rotation motion of the prime mover to the rotor, a rotation speed of the rotor varying with the variable speed of the prime mover;

producing the alternating current by the rotation of the rotor relative to an alternator stator, an alternator synchronous speed being defined by a relative speed between the rotor and the stator;

rotating the stator relative the rotor by driving the stator with an auxiliary machine, the rotation speed of the stator being given by the speed of the auxiliary machine, to regulate the relative speed between the rotor and the stator, the rotor and stator rotating about a common axis, including rotating the stator in a direction of rotation of the rotor when the alternator synchronous speed is above a given speed and in a direction opposite to the direction of rotation of the rotor when the alternator synchronous speed is below the given speed; and controlling the rotation of the stator to maintain said alternator synchronous speed to a power grid synchronous speed required by the power grid while the rotation speed of the rotor varies.

33. The method as claimed in claim 32, wherein said controlling comprises:

measuring a parameter indicative of at least one of said relative speed and the rotation speed of the rotor; and controlling a rotation speed of the stator using feedback on the measured parameter.

34. The method as claimed in claim 32, wherein said controlling the rotation speed of the stator comprises generating a torque control signal to control the torque to be produced by the auxiliary machine using feedback on the measured parameter.

35. The method as claimed in claim 32, further comprising, when the alternator synchronous speed is above the given speed, converting an auxiliary electric power produced by the electric machine to a converted electric power synchronized with the power grid synchronous speed and reclaiming the converted electric power.

36. The method as claimed in claim 32, wherein said prime mover comprises a wind turbine and wherein said actuating comprises connecting the alternator rotor to the wind turbine.

* * * * *